INVENTOR
M. B. Mc DAVITT
BY B. F. Stoddard
ATTORNEY

Aug. 18, 1953 M. B. McDAVITT 2,649,541

RADIANT ENERGY SIGNALING STATION

Filed Feb. 28, 1951 2 Sheets-Sheet 2

INVENTOR
M. B. Mc DAVITT
BY B. J. Stoddard
ATTORNEY

Patented Aug. 18, 1953

2,649,541

UNITED STATES PATENT OFFICE 2,649,541

RADIANT ENERGY SIGNALING STATION

Marcellus B. McDavitt, Hartsdale, N. Y., assignor to Bell Telephone Laboratories, Incorporated, New York, N. Y., a corporation of New York Application February 28, 1951, Serial No. 213,239

7 Claims. (Cl. 250—13)

This invention relates to radiant energy signaling systems and, more particularly, to channel-selecting equipment for use in a customer's mobile station in a multichannel two-way radiotelephone communication system.

A two-way radiotelephone communication system having a number of customer's stations that are mobile is commonly operated on a two-frequency basis. In accordance with this method of operation, radiant energy of one frequency is employed for the transmission of messages from a fixedly located base station to any one of the customer's mobile stations and radiant energy of a different frequency is used for the transmission of messages from any one of the customer's mobile stations to the base station. These two frequencies constitute a single two-way radiant energy signaling channel which is used by the customers in much the same manner as a conventional telephone party line. To facilitate the operation of the customers' transmitting-receiving equipments over this two-frequency channel, each customer's station is provided with means, such as a pair of quartz crystals, for tuning its transmitting and receiving oscillators to the respective transmitting and receiving frequencies allotted to the communication channel.

A single channel system of this type can be operated satisfactorily provided the number of customers is not large and provided the outer limits of the area served by the system are not too distant from the fixedly located base station. Accordingly, if either or both of these limiting factors is increased, the quality of service can be improved by using a multichannel system employing two or more two-frequency signaling channels. For example, in the event that it is desired to furnish radiotelephone communication service over a wide area, it is advantageous to divide the service area into a number of geographic zones and to assign to each zone a different two-frequency channel for use exclusively therein. In other words, one two-frequency channel is used exclusively by the mobile customers that are located in one geographic zone and a different two-frequency channel is used exclusively by all the customers in another zone. With this method of operation, when a customer's mobile station moves from one zone to another, it becomes necessary to change the operating frequencies of the customer's radio transmitting and receiving equipments from the two-frequencies of the channel in the first zone to the two-frequencies constituting the channel assigned to the second zone.

This change may be readily effected in any suitable manner, such as by substituting a different pair of quartz crystals in the tuning circuits of the customer's transmitting and receiving oscillators.

In the event that a large number of customers' stations are located within a single service zone and the party line type of service provided by using only one channel within that zone becomes inadequate, it is then advisable to employ multichannel operation within that particular zone so that each customer located therein can initiate and receive calls over any one of a number of two-frequency channels. With this method of operation, if a customer attempts to initiate a call over one channel and discovers that the channel is busy, instead of being forced to wait until the channel becomes idle, he can immediately switch the operating frequencies of his transmitting and receiving equipments to the two companion frequencies allotted to another channel. The operating efficiency of such a multichannel system can be improved by dividing all the customers within the service zone into as many groups as there are channels available and by assigning a different channel to each group for preferential use in initiating calls. The two-frequency channel thus assigned to a group of customers for preferential use in initiating calls may be referred to as their assigned channel and the other two-frequency channels which are available for their use when their assigned channel is busy may be referred to as their unassigned channels. Customers who request service in another multichannel service zone in addition to their home service zone may be assigned a second channel for preferential use in the second zone.

Various methods may be employed for switching the operating frequencies of a customer's radio transmitting and receiving equipments from the two frequencies assigned to one channel to the two frequencies allotted to another channel. One convenient method is to provide a customer's station with a plurality of different frequency-determining circuits which can be selectively connected to the transmitting and receiving oscillators at that station by means of a switching circuit controlled by a manually operable switch. Thus, when a customer moves his manual switch from one channel-selecting position to another, the different frequency-determining circuits are alternatively connected to the customer's transmitting and receiving oscillators for changing the frequency of the electric wave energy generated by them. Customers who request service in another zone in addition to their home zone may be provided with additional frequency-determining means and additional switch positions for use in the second zone.

Accordingly, when a customer wishes to initiate a call, he moves his manual switch to the assigned preferential channel-selecting position thereby connecting his preferential frequency-determining circuits to his transmitting and receiving oscillators. If the preferential channel assigned to his group is busy, he then moves his manual switch to one of the unassigned channel-selecting positions to connect another pair of frequency-determining circuits to the oscillators in his transmitting and receiving equipments. If this unassigned channel is also busy, the channel-selecting procedure is repeated until the customer finds an idle channel. Having found an idle channel, the customer then proceeds with the transmission of his message. By thus permitting each customer to initiate calls over unassigned channels when the channel assigned for preferential use is busy, the operating efficiency of this system is improved because the customer will encounter fewer delays in making calls by following this method of operation than he would if he were restricted to only one channel.

Although this method of operation facilitates the initiation of a call from a customer's station, it complicates the placing of a call from a base station to a customer's station. This is due to the fact that a customer can receive calls from a base station only over the particular channel to which his communication equipment happens to be tuned and an operator at a base station has no way of knowing the identity of this channel because the customer may have placed his manual switch in any one of its several channel-selecting positions. Under these circumstances, it would be necessary for an operator at a base station to attempt to communicate with a customer over first one channel and then another. Such a searching procedure would consume an appreciable amount of the operator's time and would also involve use of the different channels thereby making them unnecessarily busy.

The procedure to be followed in the placing of a call from a base station to a customer's station may be considerably simplified if the transmission of selective calling signals from a base station to a customer's station is restricted to only the channel which has been assigned to the customer for preferential use. When this simplified procedure is followed, each customer, after terminating communication over an unassigned channel, should move his manual switch to its preferential channel-selecting position so as to leave his receiving equipment tuned to the preferential channel. However, there may be occcasions when a customer, after making a call over an unassigned channel, will forget to restore his manual switch to its assigned channel-selecting position. This is a serious omission because it will leave the customer's receiving equipment tuned to an unassigned channel and he will therefore be unable to receive selective calling signals as long as this condition exists.

Accordingly, it is an object of this invention to provide a cusomer's station in a two-way multichannel signaling system with selecting means for conditioning his communication equipment for use with any one of the signaling channels and for automatically conditioning the equipment for use with a preferential channel whenever the equipment is in an idle condition.

It is also an object of the invention to provide a customer's station in a multi-zone signaling system having a plurality of signaling channels assigned for use in each zone with selecting means for conditioning the communication equipment thereat for use with any one of the signaling channels and for automatically conditioning the equipment for use with a preferential channel in one of the zones whenever the equipment is in an idle condition.

These and other objects of the invention are accomplished in a system of the type described above by providing a customer's station with means including control equipment for selectively activating a plurality of electroresponsive means which control the frequency-determining circuits associated with the customer's transmitting and receiving oscillators. This control equipment includes an instrumentality for limiting the selective activating procedure to periods when the customer's telephone equipment is not in an idle condition. In addition, the control equipment comprises circuit means for activating only the electroresponsive means associated with the assigned preferential signaling channel whenever the customer's telephone equipment is in an idle condition. If more than one preferential channel is assigned to the customer, as would be the case when his station operates in more than one zone, then at least one of the electroresponsive means that are associated with the plurality of preferential channels will be activated by the above-mentioned circuit means during idle periods.

These and other features of the invention are more fully discussed in connection with the following detailed description of the drawing in which.

Figure 1:
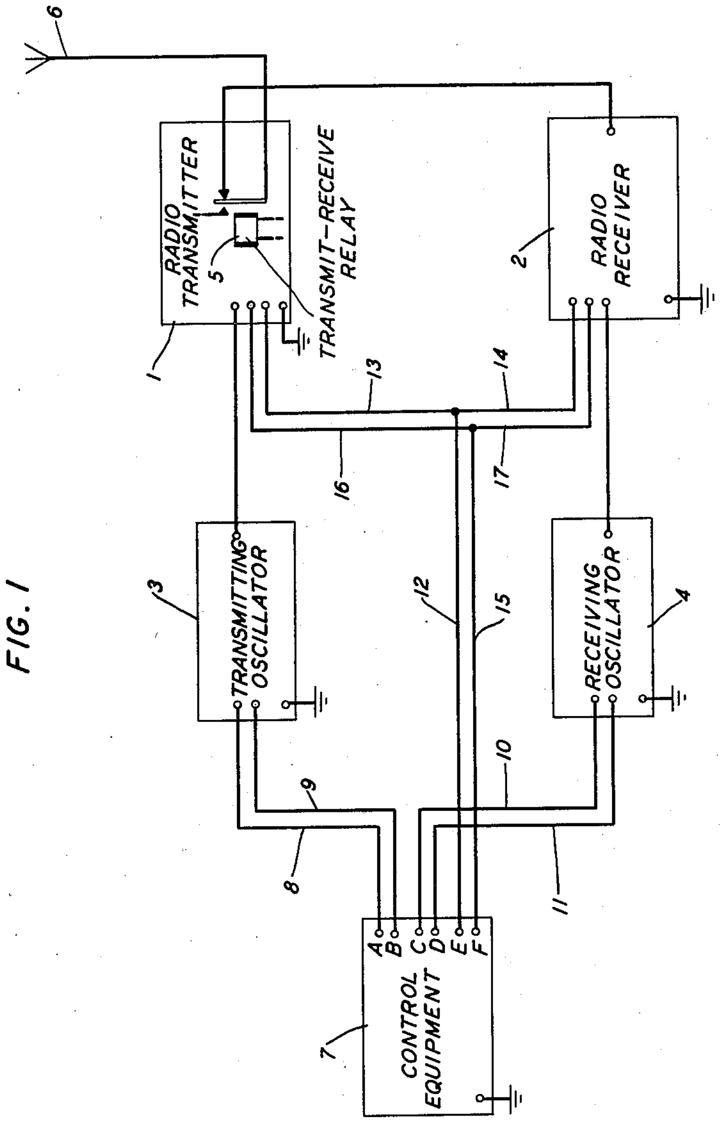
Fig. 1 is a schematic block diagram of a customer's radiotelephone signaling station in a two-way multichannel radio-telephone communication system.

In Fig. 1. a customer's radiotelephone station for use in a multichannel two-way radio communication system is shown to be provided with a conventional radio transmitter 1 and a radio receiver 2 which is preferably of the superheterodyne type. Exciting voltage for the radio transmitting equipment 1 is supplied by a transmitting oscillator 3, and beating oscillator voltage is applied to the radio receiving equipment 2 by a receivingo scillator 4. Since the customer's communication equipment is to be used with any one of a number of allotted radiant energy signaling channels, both of the oscillators 3 and 4 are of a type which generates electric wave energy of adjustable frequency, the frequency generated at any one time being determined by a frequency-determining circuit associated with the oscillator. This frequency-determining circuit may be of any appropriate design known to those skilled in the art. For example, it may be of a type which controls the frequency generated by its associated oscillator by means of a selected one of a number of quartz crystals. Thus, the frequency of the electric wave energy generated by either of the oscillators 3 and 4 can be readily changed by simply substituting one crystal for another.

As is indicated in Fig. 1, the transmitting equipment 1 includes a conventional transmit-receive switching relay 5 for selectively connecting a transmitting-receiving antenna 6 to either the transmitter 1 or to the receiver 2. Energization of relay 5 is controlled by the customer in the usual manner through the operation of a conventional push-to-talk button on his telephone handset. The relay 5 is shown to be normally unenergized with its armature released and in engagement with its back contact. This serves to connect the antenna 6 to the radio receiver 2 so that it will normally be in condition for receiving selective calling signals.

Figure 2:
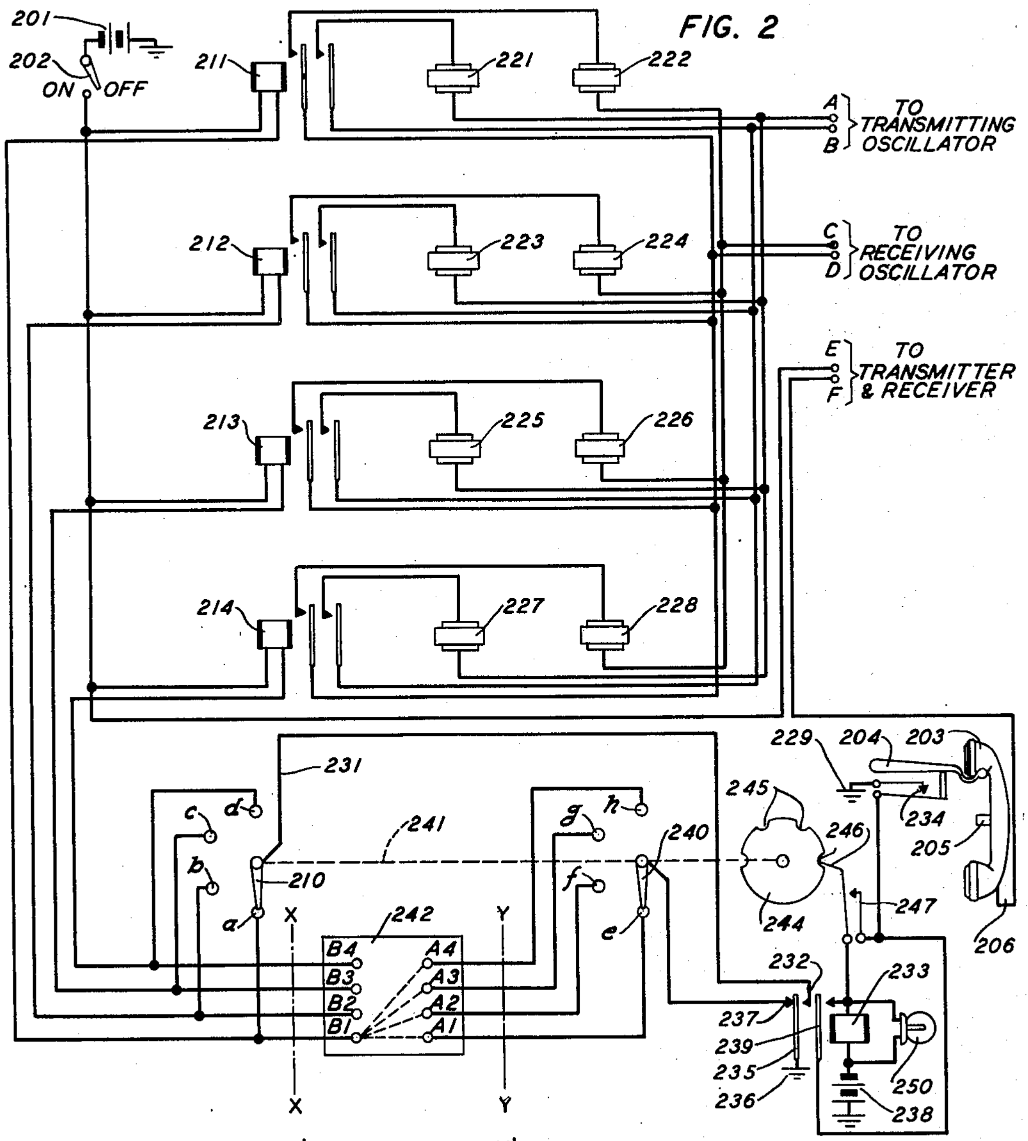
Fig. 2 is a circuit diagram of a preferred embodiment of the invention.

The customer's station also includes control equipment 7, shown in detail in Fig. 2, for selectively conditioning the customer's communication equipment for operation over any one of the plurality of two-frequency radiant energy signaling channels that are allotted to the radiotelephone system of which this station is a part. As is indicated in Fig. 1, the control equipment 7 is provided with a number of terminals A, B, C, D, E and F which are also shown in Fig. 2. Terminals A and B are connected by conductors 8 and 9 to the transmitting oscillator 3; terminals C and D are connected by conductors 10 and 11 to the receiving oscillator 4; terminal E is connected by conductors 12, 13, and 14 to both the radio transmitting equipment 1 and the radio receiving equipment 2; and terminal F is connected by cables 15, 16 and 17 to both the transmitter 1 and the receiver 2. The functions performed by these connections are explained hereinafter in connection with the following detailed description of Fig. 2.

A preferred embodiment of the control equipment 7, indicated schematically in Fig. 1, is illustrated in detail in Fig. 2 wherein it is shown to include a source of electric energy constituted by a battery 201, and a conventional on-off switch 202 for connecting the battery 201 over an obvious circuit to the terminal E. The electric power thus connected to the terminal E is supplied over the conductors 12, 13, and 14, shown in Fig. 1, to the radio transmitting and receiving equipments 1 and 2 for energization thereof. The customer usually moves the switch 202 to its "on" position at the beginning of a business day, and at the conclusion thereof moves it to its "off" position.

The control equipment of Fig. 2 also includes a conventional telephone handset 203 and a suitable contact-operating holder, such as a hook switch 204, for holding the telephone instrument 203 during idle periods when the customer is not using his radio transmitter 1 and radio receiver 2. The handset 203 is equipped with a standard push-to-talk button 205 and the usual multiconductor cord 206. The cord 206 connects the microphone, the earphone, and the push-to-talk button 205 of the telephone handset 203 to the terminal F which, in turn, is connected by the cables 15, 16, and 17 of Fig. 1 to the radio transmitter 1 and the radio receiver 2. The push-to-talk button 205 functions in the usual manner to control the energization of the transmit-receive switching relay 5, shown in Fig. 1. Thus, when the push-to-talk button 205 is depressed, it closes a conventional circuit for energizing the relay 5. Energization of relay 5 causes it to operate its armature to switch the antenna 6 from the relay's back contact, which is connected to the radio receiver 2, to the relay's front contact, which is connected to the radio transmitter 1 thus switching the antenna 6 from the receiver 2 to the transmitter 1.

As was stated above, the transmitting and receiving oscillators 3 and 4 are of a type which generates electric wave energy of variable frequency, the frequency generated at any one time by either of the oscillators 3 and 4 being determined by a selected one of a plurality of quartz crystals connected in frequency-determining circuits associated with the oscillators 3 and 4. In the embodiment of the invention that is shown in the drawing, it is assumed that the customer is allotted four different two-frequency radiant energy signaling channels. Accordingly, the customer's station is provided with eight quartz crystals 221 to 228, inclusive, each being connected into a separate frequency-determining circuit. The four-frequency-determining circuits into which the crystals 221, 223, 225, and 227 are connected, extend to the terminals A and B which, as was stated above, are coupled to the transmitting oscillator 3. Similarly, the four-frequency-determining circuits into which the crystals 222, 224, 226, and 228 are connected, extend to the terminals C and D which are coupled to the receiving oscillator 4.

Since each of the four two-frequency radiant energy signaling channels allotted to the customer comprises one frequency allocation for use in transmitting signals from the radio transmitting equipment 1 and a different frequency allocation for use by the radio receiving equipment 2 in receiving signals, it is necessary to change the tuning of both the transmitting oscillator 3 and the receiving oscillator 4 to the proper companion frequencies whenever the customer's communication equipment is switched from operation over one two-frequency channel to operation over a different two-frequency channel. This is accomplished by providing the customer's station with four control relays 211 to 214 inclusive, each having two armatures and two contacts, and by connecting each frequency-determining circuit to a different armature and its associated contact, the frequency-determining circuits coupled to the transmitting oscillator 3 being paired with their respective companion frequency-determining circuits coupled to the receiving oscillator 4 in such a manner that each pair is connected to armatures and contacts of the same control relay. In the embodiment shown in the drawing, each of the channel-selecting relays 211 to 214, inclusive has its outer armature and contact connected to one of the four frequency-determining circuits containing the crystals 221, 223, 225, and 227 associated with the transmitting oscillator 3, and has its inner armature and contact connected to one of the crystals 221, 224, 226, and 228 associated with the receiving oscillator 4.

When relay 11, for example, becomes energized, it moves its two armatures into engagement with their respective contacts. The engagement of the outer armature and contact of relay 211 closes the frequency-determining circuit containing the crystal 221 which is associated with the transmitting oscillator 3 and, similarly, the engagement of the inner armature and contact of relay 211 closes the frequency-determining circuit containing the crystal 222 that is associated with the receiving oscillator 4. In this manner, the energization of relay 211 causes the transmitting and receiving oscillators 3 and 4 to be tuned by the crystals 221 and 222, respectively, to the companion frequencies of one of the allotted channels. Thus, the customer's radio transmitting and receiving equipments 1 and 2 can be conditioned for operation over any one of the available two-frequency channels by selectively energizing the appropriate one of the channel-selecting relays 211 to 214, inclusive.

The selective energization of the channel-switching relays 211 to 214, inclusive, is accomplished in part by manually moving a tap switch 210 into engagement with one of a number of different channel-conditioning contacts *a*, *b*, *c*, and *d*. Each of the contacts *a*, *b*, *c*, and *d* is connected over an obvious circuit to one side of the energizing winding of a different one of the control relays 211 to 214, inclusive. The other side of each of these relay windings is connected over the on-off switch 202 to the battery 201. The manual switch 210 is connected by a conductor 231 to the inner contact 232 of an armature 235 of a relay 233. It is to be noted that the energizing circuit of the relay 233 includes a pair of contact springs 234 which are so arranged as to be held open when the handset 203 is on the hook switch 204. Thus, the relay 233 cannot be energized until the handset 203 is removed from the hook switch 204, thereby permitting the spring contacts 234 to close.

As was stated above, in a multichannel radiotelephone communication system of the type described above, the customers are divided into as many groups as there are channels available and each group is assigned a different channel for use in initiating calls. Furthermore, as was explained above, whenever a customer's station is in an idle condition, its communication equipment should be automatically tuned to the preferential channel so that it will be in proper condition for receiving selective calling signals transmitted from the base station. Of course, the movement of the on-off switch 202 to its "off" position places the station equipment in an idle condition. However, for the purpose of this description, the idle condition of the station equipment may be defined as the condition which exists when the handset 203 is held by the hook switch 204. Assuming that the customer whose station is shown in the drawing is assigned for preferential use the channel having transmitting and receiving frequencies corresponding to the frequencies determined by the crystals 221 and 222, then the frequency-determining circuits associated therewith should be closed by the automatic energization of the control relay 211 whenever the handset 203 is placed on the hook switch 204.

This automatic energization of the relay 211 is accomplished by mounting another tap switch 240 in tandem with the switch 210 by means of a common operating shaft 241 so that the switch 240 will follow the movement of the switch 210. The switch 240 is connected to ground 236 over the normally closed outer contacts 237 of the armature 235 of relay 233. The switch 240 is provided with four contacts *e*, *f*, *g*, and *h* which are positioned at points corresponding to the locations of the contacts *a*, *b*, *c*, and *d* so that, when the switch 210 is moved into engagement with one of its contacts, the switch 240 will also be moved into engagement with a corresponding one of its contacts. Each of the contacts *e*, *f*, *g*, and *h* is connected to a different one of a group of four terminals A1, A2, A3, and A4 mounted on a terminal block 242. Similarly, each of the contacts *a*, *b*, *c*, and *d* is connected to a different one of another group of four terminals B1, B2, B3, and B4 on the terminal block 242. Each of this second group of terminals B1 to B4 inclusive, is also connected to the energizing winding of a different one of the channel-selecting relays 211 to 214, inclusive. Since in this example relay 211 is the control relay that is associated with the preferential channel-selecting crystals 221 and 222, its associated terminal B1 is connected to each of the terminals A1 to A4, inclusive. Thus, regardless of which position the switches 210 and 240 are moved to at any particular time, the energizing winding of the preferential control relay 211 will be coupled to the ground 236, provided the armature 235 of relay 233 is in engagement with its break contact 237.

In order to effect the engagement of the armature 235 with its break contact 237 during idle periods, a cam 244 is mounted upon the common operating shaft 241 for movement with the switches 210 and 240. Four notches, or depressions, 245 are formed in the circumference of the cam 244 at spaced intervals corresponding to the contact-engaging positions of the switches 210 and 240. A cam follower 246, having an associated contact member 247, is so mounted that, when it is positioned in one of the notches 245, it does not engage its contact member 247. For the purpose of assisting in controlling the energization of relay 233, the cam follower 246 is connected through the winding of relay 233 to a battery 238, and the contact member 247 is connected to one of the contact springs 234.

When the customer's station is in operation, the on-off switch 202 is moved to its "on" position to apply current from battery 201 to the energizing windings of the control relays 211 to 214, inclusive, and also over terminal E to the radio transmitting and receiving equipments 1 and 2. In accordance with the usual practice, as was stated above, the switch 202 in maintained closed throughout the business day. If the customer wishes to initiate a call, he removes his telephone instrument 203 from its holder 204 thereby permitting the closing of the contact springs 234. This applies ground 229 to the contact member 247 thus preparing the energizing circuit of relay 233 for subsequent closure. Since the relay 233 is not energized at this time, its outer armature 235 will be in engagement with its contact 237 thus completing a circuit for energizing the control relay 211. Accordingly, relay 211 operates its armatures to close the preferential frequency-determining circuits associated with the crystals 221 and 222 thus tuning the customer's transmitting and receiving oscillators 3 and 4 to the assigned preferential channel.

If the customer discovers by listening to his handset 203 that his assigned channel is busy, he then moves his manual switch 210 to an unassigned channel-selecting position, such as to the contact *b*. This movement of the switch 210 is accompanied by a corresponding movement of the cam 244 and the switch 240, the switch 240 moving to engage its contact *f*. The movement of the cam 244 at this time causes the cam follower 246 to move to the next adjacent notch 245. In so doing, the cam follower 246 rides over the raised portion on the cam 244 between the two adjacent notches 245 thus momentarily engaging its associated contact member 247. This brief engagement of the cam follower 246 with its contact member 247 is sufficient for current to flow from battery 238 through the winding of relay 233, engaged cam follower 246 and contact member 247, and then over the closed contact springs 234 to ground 229. Relay 233 consequently becomes energized and operates its armatures, its inner armature 239 engaging its associated contact to complete an obvious locking circuit through the hook switch contacts 234. Thus, relay 233 will remain energized until the handset 203 is replaced upon the hook switch 204.

If desired, an indicating device, such as a lamp 250, may be connected in parallel with the relay 233. The lighting of the lamp 250 during periods when the handset 203 is off the hook switch 204 serves as an indication that the switch 210 has been moved to an unassigned channel-selecting position.

In moving away from its break contact 237, the outer armature 235 of relay 233 disconnects ground 236 from the switch 240 thereby opening the energizing circuit of relay 211 which thereupon releases its armatures to discontinue control of the transmitting and receiving oscillators 3 and 4 by the crystals 221 and 222. In moving into engagement with its make contact 232, the armature 235 applies ground 236 to a circuit extending over the conductor 231, switch 210, contact *b*, winding of relay 212, and then over switch 202 to battery 201. The resulting operation of the armatures of relay 212 closes the frequency-determining circuits associated therewith and causes the tuning of the transmitting and receiving oscillators 3 and 4 to be now controlled by the crystals 223 and 224.

If the communication channel to which the customer's transmitting and receiving equipments 1 and 2 are now tuned is idle, the customer proceeds with the transmission of his call. On the other hand, if this second communication channel is busy, the customer continues to rotate his manual switch 210 to successively energize the remainder of the control relays until an idle channel is selected.

At the termination of his call, the customer replaces his handset 203 upon the hook switch 204. If the customer has left his channel-selecting switch 210 in engagement with an unassigned channel-selecting contact, such as the contact *d*, his communication equipment will, due to the use of this invention, nevertheless be tuned to the assigned preferential channel. This result follows from the fact that the placing of the handset 203 upon the hook switch 204 opens the contact springs 234 thereby disconnecting ground 229 from the locking circuit of relay 233. Relay 233 consequently releases its armatures to apply ground 236 over its outer armature 235 and contact 237 to the switch 240. Since it was assumed above that the switch 210 was left on its contact *d* and since the switch 240 follows the movement of the switch 210, then the switch 240 will, at this time, be on its contact *h* so that ground 236 will be applied to the terminal A4 which, as was stated above, is connected to the terminal B1. Thus, the engagement of the armature 235 with its contact 237 closes a circuit for current from battery 201 to energize the preferential control relay 211 which operates its armatures to condition the customer's communication equipment for operation over the assigned preferential channel. As all of the terminals A1 to A4, inclusive, are connected to the terminal B1, the placing of the telephone instrument 203 on its holder 204 will always automatically effect the energization of the relay 211 for tuning the station equipment to the preferential channel regardless of the position of the channel-selecting switch 210.

Figure 2A:
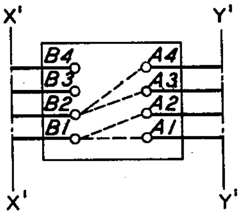
Fig. 2A illustrates a modification of a portion of the circuit shown in Fig. 2.

When the customer's mobile station operates in more than one service zone, a different preferential channel will be assigned for each zone and the terminals A1 to A4, inclusive will then be connected to the particular B terminals that are associated with the preferential channel-selecting relays. For example, if the customer is assigned for preferential use the two channels selected by crystals 221—222 and crystals 223—224, then the terminals B1 and B2 that are connected to the preferential channel-selecting relays 211 and 212, respectively, will be also connected to the terminals A1 to A4, inclusive, in the manner shown in Fig. 2A. As can be seen in Fig. 2A, terminals A1 and A2 are connected to terminal B1 and terminals A3 and A4 are connected to terminal B2. Thus, regardless of which position the customer leaves the switch 210, one of the terminals B1—B2 will be grounded and its associated control relay will be energized to condition the customer's communication equipment for use over the respective preferential channel.

It is to be understood that this specific embodiment of the invention has been shown and described for the purpose of explaining the principles and features of operation of the invention. Various modifications thereof may be made without exceeding the scope of the invention which is defined in the claims appended hereto. Furthermore, the invention is not restricted to use with a mobile radiotelephone communication system but is applicable to other types of radiant energy signaling systems.

What is claimed is:

1. A radiant energy signaling station comprising in combination a plurality of electroresponsive relays each having a contact and an armature for engaging said contact, an oscillator for generating electric wave energy of adjustable frequency, a plurality of frequency-determining circuits for determining the frequency of the electric wave energy generated by said oscillator, each of said frequency-determining circuits including the contact and armature of a different one of said relays, each frequency-determining circuit being closed when its associated relay is energized for moving its armature into engagement with its contact and being opened when its associated relay is deenergized for releasing its armature from engagement with its contact, control means for individually energizing only one of said relays at any one time, said control means including a common battery, circuit means extending from each of said relays to said battery, a tap switch having a movable switch arm and a plurality of contacts, a plurality of electric conductors each extending from a respectively different one of said switch contacts to a respectively different one of said relays, a control contact, means for intermittently coupling said control contact to ground, a cam follower, a rotatably mounted cam for intermittently moving said cam follower into and out of engagement with said control contact, means for mechanically coupling said rotatably mounted cam to said movable switch arm for corresponding movement therewith, an additional electroresponsive relay having a contact and an armature for engaging said contact, the armature of said additional relay being grounded and its contact being electrically coupled to said movable switch arm, a source of electric energy, means for electrically connecting one side of said additional relay to said source, and means for electrically connecting the other side of said additional relay to said cam follower.

2. A radiant energy signaling station comprising in combination radio communication equipment, a telephone instrument coupled to said equipment, an oscillator for generating electric wave energy of adjustable frequency, means for coupling said oscillator to said equipment, a plurality of electroresponsive relays each having a contact and an armature for engaging said contact, a plurality of frequency-determining circuits for determining the frequency of the electric wave energy generated by said oscillator, each of said frequency-determining circuits including the contact and armature of a different one of said relays, each frequency-determining circuit being closed when its associated relay is energized for moving its armature into engagement with its contact and being opened when its associated relay is deenergized for releasing its armature from engagement with its contact, control means for individually energizing only one of said relays at any one time, said control means including a common battery, circuit means extending from each of said relays to said battery, a tap switch having a movable switch arm and a plurality of contacts, a plurality of electric conductors each extending from a respectively different one of said switch contacts to a respectively different one of said relays, a pair of spring contacts, a control contact, means for connecting said control contact to one of said spring contacts, means for connecting the other of said spring contacts to ground, actuating means for alternatively opening and closing said pair of spring contacts, said actuating means including means for removably holding said telephone instrument, a cam follower, a rotatably mounted cam for intermittently moving said cam follower into and out of engagement with said control contact, means for mechanically coupling said rotatably mounted cam to said movable switch arm for corresponding movement therewith, an additional electroresponsive relay having a contact and an armature for engaging said contact, the armature of said additional relay being grounded and its contact being electrically coupled to said movable switch arm, a source of electric energy, means for electrically connecting one side of said additional relay to said source, and means for electrically connecting the other side of said additional relay to said cam follower.

3. A radiant energy signaling station comprising in combination a plurality of electroresponsive relays each having a contact and an armature for engaging said contact, an oscillator for generating electric wave energy of adjustable frequency, a plurality of frequency-determining circuits for determining the frequency of the electric wave energy generated by said oscillator, each of said frequency-determining circuits including the contact and armature of a different one of said relays, each frequency-determining circuit being closed when its associated relay is energized for moving its armature into engagement with its contact and being opened when its associated relay is deenergized for releasing its armature from engagement with its contact, control means for individually energizing only one of said relays at any one time, said control means including a common battery, circuit means extending from each of said relays to said battery, a first tap switch having a movable switch arm and a plurality of contacts, a first plurality of electric conductors each extending from a respectively different one of said switch contacts to a respectively different one of said relays, a control contact, means for intermittently coupling said control contact to ground, a cam follower, a rotatably mounted cam for intermittently moving said cam follower into and out of engagement with said control contact, means for mechanically coupling said rotatably mounted cam to said movable switch arm for corresponding movement therewith, an additional electroresponsive relay having first and second contacts and an armature for engaging said contacts, the armature of said additional relay being grounded and its contact being electrically coupled to the movable switch arm of said first tap switch, a source of electric energy, means for electrically connecting one side of said additional relay to said source, means for electrically connecting the other side of said additional relay to said cam follower, a second tap switch having a movable switch arm and a plurality of contacts, means for mechanically connecting the movable switch arm of said second tap switch in tandem with the movable switch arm of said first tap switch for corresponding movement therewith, means for electrically connecting the switch arm of said second tap switch to the second contact of said additional relay, and a second plurality of electric conductors each extending from a respectively different one of the contacts of said second tap switch to a common one of said first plurality of electric conductors.

4. A radiant energy signaling station comprising in combination a plurality of electroresponsive relays each having a contact and an armature for engaging said contact, an oscillator for generating electric wave energy of adjustable frequency, a plurality of frequency-determining circuits for determining the frequency of the electric wave energy generated by said oscillator, each of said frequency-determining circuits including the contact and armature of a different one of said relays, each frequency-determining circuit being closed when its associated relay is energized for moving its armature into engagement with its contact and being opened when its associated relay is deenergized for releasing its armature from engagement with its contact, control means for individually energizing only one of said relays at any one time, said control means including a common battery, circuit means extending from each of said relays to said battery, a first tap switch having a movable switch arm and a plurality of contacts, a first plurality of electric conductors each extending from a respectively different one of said switch contacts to a respectively different one of said relays, a control contact, means for intermittently coupling said control contact to ground, a cam follower, a rotatably mounted cam for intermittently moving said cam follower into and out of engagement with said control contact, means for mechanically coupling said rotatably mounted cam to said movable switch arm for corresponding movement therewith, an additional electroresponsive relay having first and second contacts and an armature for engaging said contacts, the armature of said additional relay being grounded and its contact being electrically coupled to the movable switch arm of said first tap switch, a source of electric energy, means for electrically connecting one side of said additional relay to said source, means for electrically connecting the other side of said additional relay to said cam follower, a second tap switch having a movable switch arm and a plurality of contacts, means for mechanically connecting the movable switch arm of said second tap switch in tandem with the movable switch arm of said first tap switch for corresponding movement therewith, means for electrically connecting the switch arm of said second tap switch to the second contact of said additional relay, and a second plurality of electric conductors each having one end connected to a respectively different one of the contacts of said second tap switch, a first group of said second plurality of conductors having their other ends connected to a common one of said first plurality of conductors, and a second group of said second plurality of conductors having their other ends connected to a different common one of said first plurality of conductors.

5. A radiant energy signaling station for signaling over any one of a plurality of allotted radiant energy signaling channels, said station comprising in combination signaling equipment, channel-selecting means for selectively tuning said equipment for operation with any one of said channels, said channel-selecting means including a selector switch having a plurality of channel-selecting positions, said selector switch being manually movable to any one of its channel-selecting positions for effecting the changing of the tuning of said equipment from one of said channels to another of said channels, said switch remaining in the channel-selecting position to which it has been moved until it is manually removed therefrom to another channel-selecting position, a telephone instrument coupled to said signaling equipment, a holder for removably holding said telephone instrument during idle periods of said equipment, said instrument being manually removed from said holder when said equipment is to be used for communication purposes, control means for superseding said selector switch and for effecting the tuning of said equipment for operation with only an assigned one of said channels, and auxiliary control means actuated by the holding of said telephone instrument by said holder for enabling said control means and for disabling said selector switch, said auxiliary control means being alternatively actuated by the removal of said telephone instrument from said holder for disabling said control means and for enabling said selector switch.

6. A radiant energy signaling station for signaling over any one of a plurality of allotted radiant energy signaling channels, said station comprising in combination signaling equipment, channel-selecting means for selectively tuning said equipment for operation with any one of said channels, said channel-selecting means including a selector switch having a plurality of channel-selecting positions, said selector switch being manually movable to any one of its channel-selecting positions for effecting thte changing of the tuning of said equipment from one of said channels to another of said channels, said switch remaining in the channel-selecting position to which it has been moved until it is manually removed therefrom to another channel-selecting position, a telephone instrument coupled to said signaling equipment, a holder for removably holding said telephone instrument during idle periods of said equipment, said instrument being manually removed from said holder when said equipment is to be used for communication purposes, control means for superseding said selector switch and for effecting the tuning of said equipment for operation with only an assigned one of said channels, an electroresponsive device for enabling said control means and said selector switch alternatively and for disabling them alternatively, a circuit for energizing said electroresponsive device, said circuit having two portions connected in series, both of said portions being normally open, means actuated by the removal of said telephone instrument from said holder for closing one of said portions, and means actuated by movement of said selector switch for closing the other of said portions.

7. A radiant energy signaling station for signaling over any one of a plurality of allotted radiant energy signaling channels, said station comprising in combination signaling equipment, channel-selecting means for selectively tuning said equipment for operation with any one of said channels, said channel-selecting means including a selector switch having a plurality of channel-selecting positions, said selector switch being manually movable to any one of its channel-selecting positions for effecting the changing of the tuning of said equipment from one of said channels to another of said channels, said switch remaining in the channel-selecting position to which it has been moved until it is manually removed therefrom to another channel-selecting position, a telephone instrument coupled to said signaling equipment, a holder for removably holding said telephone instrument during idle periods of said equipment, said instrument being manually removed from said holder when said equipment is to be used for communication purposes, control means for superseding said selector switch and for effecting the tuning of said equipment for operation with only an assigned one of said channels, an electroresponsive device for enabling said control means and said selector switch alternatively and for disabling them alternatively, a circuit for energizing said electroresponsive device, said circuit having a normally open portion, means actuated by movement of said selector switch for closing said portion, a locking circuit for maintaining said electroresponsive device energized after said energizing circuit has been closed, and means actuated by the holding of said telephone instrument by said holder for opening said locking circuit for effecting the deenergization of said electroresponsive device.

MARCELLUS B. McDAVITT.

References Cited in the file of this patent

UNITED STATES PATENTS

| Number | Name | Date |
|---|---|---|
| 1,572,756 | Smythe et al. | Feb. 9, 1926 |
| 1,608,551 | Demarest et al. | Nov. 30, 1926 |
| 1,619,228 | Williams et al. | Mar. 1, 1927 |
| 2,064,894 | Espenschied | Dec. 22, 1936 |
| 2,064,896 | Espenschied | Dec. 22, 1936 |
| 2,064,961 | Tidd | Dec. 22, 1936 |
| 2,479,701 | Ress | Aug. 23, 1949 |